United States Patent
Jiang et al.

(10) Patent No.: US 9,536,143 B2
(45) Date of Patent: Jan. 3, 2017

(54) SYSTEMS AND METHODS FOR IMAGING SEISMIC DATA

(75) Inventors: Fan Jiang, Sugar Land, TX (US); Shengwen Jin, Sugar Land, TX (US)

(73) Assignee: Landmark Graphics Corporation, Houston, TX (US)

(*) Notice: Subject to any disclaimer, the term of this patent is extended or adjusted under 35 U.S.C. 154(b) by 0 days.

(21) Appl. No.: 14/422,096

(22) PCT Filed: Aug. 17, 2012

(86) PCT No.: PCT/US2012/051387
§ 371 (c)(1),
(2), (4) Date: Feb. 17, 2015

(87) PCT Pub. No.: WO2014/028030
PCT Pub. Date: Feb. 20, 2014

(65) Prior Publication Data
US 2015/0235081 A1    Aug. 20, 2015

(51) Int. Cl.
G06K 9/00    (2006.01)
G06K 9/52    (2006.01)
G06T 7/00    (2006.01)

(52) U.S. Cl.
CPC ............ G06K 9/00476 (2013.01); G06K 9/52 (2013.01); G06T 7/0051 (2013.01)

(58) Field of Classification Search
CPC ...... G06K 9/00476; G06K 9/52; G06T 7/0051
USPC ....................................................... 382/109
See application file for complete search history.

(56) References Cited

U.S. PATENT DOCUMENTS

| | | | | |
|---|---|---|---|---|
| 4,809,235 | A | * | 2/1989 | Dragoset, Jr. .......... G01V 1/364 367/20 |
| 5,392,213 | A | * | 2/1995 | Houston ................ G01V 1/362 367/124 |
| 5,933,789 | A | * | 8/1999 | Byun ...................... G06F 17/10 367/48 |
| 5,999,488 | A | | 12/1999 | Smitg |
| 6,021,094 | A | | 2/2000 | Ober et al. |
| 6,519,532 | B2 | | 2/2003 | Meng |
| 6,687,659 | B1 | | 2/2004 | Shen |
| 7,400,553 | B1 | | 7/2008 | Jin et al. |
| 7,675,815 | B2 | | 3/2010 | Saenger et al. |
| 8,116,168 | B1 | | 2/2012 | Luo et al. |
| 2002/0120429 | A1 | | 8/2002 | Ortoleva |

(Continued)

FOREIGN PATENT DOCUMENTS

| | | |
|---|---|---|
| DE | 19841262 A1 | 3/2000 |
| EP | 2184620 A1 | 3/2009 |

(Continued)

OTHER PUBLICATIONS

Guojian Shan; Optimized implicit finite-difference migration for TTI media; SEG; dated 2007; 5 pages; San Antonio; Texas.*

(Continued)

*Primary Examiner* — Gregory F Cunningham
(74) *Attorney, Agent, or Firm* — Crain, Caton & James; Alan Bryson

(57) ABSTRACT

Systems and methods for imaging seismic data using hybrid one-way wave-equation-migration in tilted transverse isotropic media and/or hybrid two-way reverse-time-migration in tilted transverse isotropic media.

20 Claims, 5 Drawing Sheets

(56) References Cited

U.S. PATENT DOCUMENTS

| | | | |
|---|---|---|---|
| 2003/0195705 A1* | 10/2003 | Leaney | G01V 1/48 |
| | | | 702/14 |
| 2004/0196738 A1* | 10/2004 | Tal-Ezer | G01V 1/28 |
| | | | 367/51 |
| 2007/0168167 A1 | 7/2007 | Lou | |
| 2008/0319726 A1* | 12/2008 | Berge | E21B 41/0064 |
| | | | 703/10 |
| 2009/0213693 A1 | 8/2009 | Du et al. | |
| 2010/0054082 A1 | 3/2010 | McGarry | |
| 2010/0088035 A1 | 4/2010 | Etgen | |

FOREIGN PATENT DOCUMENTS

| | | |
|---|---|---|
| EP | 2184620 A1 | 5/2010 |
| WO | 0173476 A1 | 4/2001 |
| WO | 2007081855 A2 | 7/2007 |
| WO | 2009092025 A2 | 7/2009 |
| WO | 2010014379 A2 | 2/2010 |
| WO | 2010053657 A1 | 5/2010 |
| WO | 2010085493 A1 | 7/2010 |
| WO | 2010085493 al | 7/2010 |
| WO | 2010085499 A1 | 7/2010 |
| WO | 2011053327 A1 | 5/2011 |
| WO | WO 2011/053327 A1 * | 5/2011 ............ G01V 1/282 |

OTHER PUBLICATIONS

Mingqiu Luo and Shengwen Jin; Hybrid One-way and Full-way Wave Equation Propagator and Prestack Migration; SEG; dated 2008; 5 pages; Las Vegas; Nevada.*

Yu Zhang, Houzhu, and Guanguan Zhang; A Stable TTI reverse time migration and its implementation; Beophysics, vol. 76 No. 3; dated May-Jun. 2011; 9 pages; Houston, Texas.*

Fred Hilterman "Advanced Reservoir Imaging Using Frequency-Dependent Seismic Attributes" 1637-NETL 2010 Semiannual Scientific/Technical, Jan.-Jun. 30, 2005 DOE Award No. DE-FC26-04NT15503 [Subsurface Imaging] Department of Geosciences, University of Houston, Texas (Discloses processing seismic data with commercially-available (COTS) software as outlined on p. 4.).

A.J. Berkhout and D.J. Verschuur, "From removing to using multiples" Paper No. 16941-MS DOI 10.4043/16941-MS Offshore Technology Conference, May 3-May 6, 2004, Houston, Texas (Disclosing that noise/artifacts formerly considered noise and multiples that were removed/discarded from samples actually provide valid data to refine and expedite processing.)(Abstract only); 2 pages.

Karyn Mutkins; First Examination Report; dated Feb. 8, 2016; 3 pages; Patent Application No. 2012387658; Australian Patent Office; Australia.

Phillip Bream; Exam Report; dated Mar. 3, 2016; 6 pages; Patent Application No. 12886507.8-1559/2885656 PCT/US 2012051387; European Patent Office; Germany.

Yu Zhang, Houzhu, and Guanguan Zhang; A Stable TTI reverse time migration and its implementation; Geophysics, vol. 76 No. 3; dated May-Jun. 2011; 9 pages; Houston, Texas.

Cowin, Graham; Response to Exam Report; dated May 16, 2016; 2 pages; Australian Patent Application No. 2012387658; Phillips, Ormonde, Fitzpatrick; Melbourne, Australia.

Murphy, Daniel J.; International Preliminary Report on Patentability; PCT/US12/51387; Apr. 9, 2015; 25 pages.

Copenheaver, Blane R., The International Search Report and the Written Opinion of the International Searching Authority, PCT/US12/51387, Oct. 19, 2012, 8 pages.

Murphy, Daniel J.; Written Opinion of the IPEA; PCT/US12/51387; Jan. 9, 2015; 10 pages.

Shan, Guojian; Optimized Implicit Finite-Difference Migration for TTI Media; SEG/San Antonio 2007 Annual Meeting; 2007; pp. 2290-2294.

Xiang Du, John C. Bancroft and Larry R. Lines, "A comparison of APSPI and ART for TTI media" CREWES Research Report—vol. 17 (2005) 1; (Disclosing a comparison of anisotropic phase-shift-plus-interpolation and reverse-time depth migration methods for tilted TI media, see examples on p. 7-8).

Patrizia Cibin, Mauro Della Martera, and Clara Anidreoletti, "Enhanced Seismic Velocity Processing to Improve 3D Geopressure Evaluation" Paper No. 134466-MS DOI 10.2118/134466-MS SPE Annual Technical Conference and Exhibition, Sep. 19-22, 2010, Florence, Italy; (Disclosing reflection tomography software to integrate geological information in the Grid Tomography loops to reach deep into High Pressure/High Temperature wells.); 2 pages.

Fred Hilterman "Advanced Reservoir Imaging Using Frequency-Dependent Seismic Attributes" 1637-NETL 2010 Semiannual Scientific/Technical, Jan.-Jun. 30, 2005 DOE Award Number: DE-FC26-04NT15503 [Subsurface Imaging) Department of Geosciences, University of Houston, Texas (Discloses processing seismic data with commercially-available (COTS) software as outlined on p. 4.).

Joseph M. Reilly, Peter Traynin, Ramesh Neelamani, and Dave Hinkley, "Novel Signal enhancement approaches and advanced seismic imaging as applied to a land 3D seismic survey" IPTC 12066-MS DOI 10.2523/12066-MS International Petroleum Technology Conference, Dec. 3-5, 2008, Kuala Lumpur, Malaysia (Discloses reducing migration artifacts unique to land-based sampling in the presence of increased noise levels not found in marine environments.)(Abstract only); 2 pages.

A.J. Berkhout and D.J. Verschuur, "From removing to using multiples" Paper No. 16941-MS DOI 10.4043/16941-MS Offshore Technology Conference, May 3-6, 2004, Houston, Texas (Disclosing that noise/ artifacts formerly considered noise and multiples that were removed/discarded from samples actually provide valid data to refine and expedite processing.)(Abstract only); 2 pages.

Armando Ruggiero Sena D'Anna, "Modeling and Imaging of Ground Penetrating Radar data" Dissertation Presented to the University of Texas at Austin Dec. 2004 (Disclosing loss of resolution in Seismic mapping with RTM on p. 19 and TTI simplification in section 2.4.2, p. 50; reducing noise & artifacts on pp. 97-98, 110 & 110.).

Stephane Operto et al, "Finite-difference frequency-domain modeling of viscoacoustic wave propagation in 2D tilted transversely isotropic (TTI) media" (Discloses removing artifacts from the last paragraph on the left col. of the 2nd p. to the 2nd paragraph in the right column, see figure 10b.); 2009.

Pavan Elapavuluri and John C. Bancroft, "Equivalent offset migration in anisotropic media" Anisotropic Eom Crewes Research Report-vol. 18 (2006) 1 (Disclosing equivalent offset (EO) method applications to anisotropic media involving depth migration techniques to define the source/receiver travel times of acquired seismic data over a physical model of an anisotropic thrust sheet eliminating artifacts, see pp. 20-22.).

Ilya Tsvankin et al, "Seismic anisotropy in exploration and reservoir characterization: An overview" Geophysics, vol. 75, No. 5 Sep.-Oct. 2010 10/1190/1.3481775 (Disclosing seismic processing with anisotropic models for various methods, pp. 75A15-75A29, 9 figures., 1 table.).

Liu Hong-Weil1 et al, " The Algorithm of High Order Finite Difference Pre-Stack Reverse Time Migration and GPU Implementation" Chinese Journal of Geophysics vol. 53, No. 4, 2010 (Imaging conditions for prestack reverse-time migration using modern graphic processors to reduce computation overheads, pp. 600-610).

Juergen Fruehn et al, "Resolving near-seabed velocity anomalies: Deep water offshore eastern India" Geophysics Vol. 73, No. 5 I Sep.-Oct. 2008 Supplement—Velocity Estimation for Depth Imaging (Discloses data preconditioning & training for velocity modeling, removing noise artifacts in p. VE237.).

J. Virieux and S. Operto, "An overview of full-waveform inversion in exploration geophysics" Geophysics, Vol. 74, No. 6 Nov.-Dec. 2009 10.1190/1.3238367 (Discloses extracting modeling data from seismograms with a forward-modeling engine and a local differential estimating approach considering inaccuracies 7 noise, pp. WCC127-WCC152, 15 figures, 1 table.).

(56) References Cited

OTHER PUBLICATIONS

Fan Jiang and Shengwen Jin: LAND008A, 2009-IP-026179 U1 PVT, Seismic Imaging Systems and Methods Employing a 3D Reverse Time Migration with Tilted Transverse Isotropy; 2009; 22 pages.

Aikhalifah, T., 1998, Acoustic approximations for processing in transversely isotropic media: Geophysics, 63, 623-631.

Baysal, E., D. D., Kosloff, and J.W. C., Sherwood, 1983, Reverse time migration: Geophysics, 48, 1514-1524.

Fletcher, R. P., X., Du, and P. J., Fowler, 2009, Reverse time migration in tilted transversely isotropic (TTI) media: Geophysics, WCAI79-WCAI87; 9 pages.

Hua, B., P., Williamson, B. Duquet, 2010, 3D TTI implicit finite difference migration with nonlinear optimized four-direction splitting expansion: 80th Annual International Meeting, SEG, Expanded Abstract, 3288-3292.

Jenkin, M. A., 1975, Algorithem 493: Zeros of a real polynomial, ACM TOMS, 1, 178-189.

Li, Z., 1991, Compensating finite-difference errors in 3D migration and modeling: Geophysics, 56, 1650-1660.

Luo, M., and S. Jin, 2008, Hybrid one-way and full-way wave equation propagator and prestack migration: 78th Annual International Meeting, SEG, Expanded Abstracts, 2336-2340.

Mcmechan, G. A., 1983, Migration by extrapolation of time-dependent boundary values: Geophysical Prospecting, 31, 413-420.

Ristow, D., and T. Ruhl, 1997, 3D implicit finite difference migration by multi-way splitting: Geophysics, 62, 554-567.

Ristow, D., and T. Ruhl, 1997, Migration in transversely isotropic media using implicit finitedifference operators: 67th Annual International Meeting, SEG, Expanded Abstract, 1699-1702.

Shan, G., and B. Biondi, 2005, 3D wavefield extrapolation in laterally varying tilted TI media: 75th Annual International Meeting, SEG, Expanded Abstracts, 104-107.

Shan, G., 2009, Optimized implicit finite difference and Fourier finite difference migration for VTI media: Geophysics, 74, WCAI89-WCAI97.

Stark, P. B. and R. L., Park, 1995, Bounded variable least square: an algorithm and applications: Computational Statistics, 129-141.

Tsvankin, I., 1996, P-wave signatures and notation for transversely isotropic media: An overview: Geophysics, 60, 1819-1829.

Valenciano, A. A., Cheng, C. C., N. Chemingui, and S. Brandsberg-Dahl, 2009, Implicit wave equation migration in TTI media using high order operators, 79th Annual International Meeting, Seg Expanded Abstract; pp. 3005-3009.

Yoon, O., K., and H., Zhou, 2001, Depth imaging with multiples: Geophysics, 66, 246-255.

Zhou, H., G. Zhang, and R. Bloor, 2006, An anisotropic acoustic wave equation for modeling and migration in 2D TTI media: 76th Annual International Meeting, SEG, Expanded Abstracts,194-198.

* cited by examiner

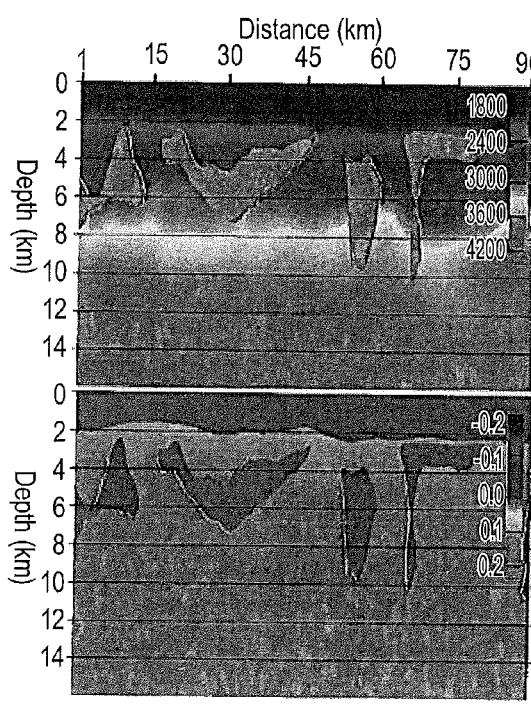
FIG. 2A  FIG. 2B
FIG. 2C  FIG. 2D

FIG. 3A
FIG. 3B
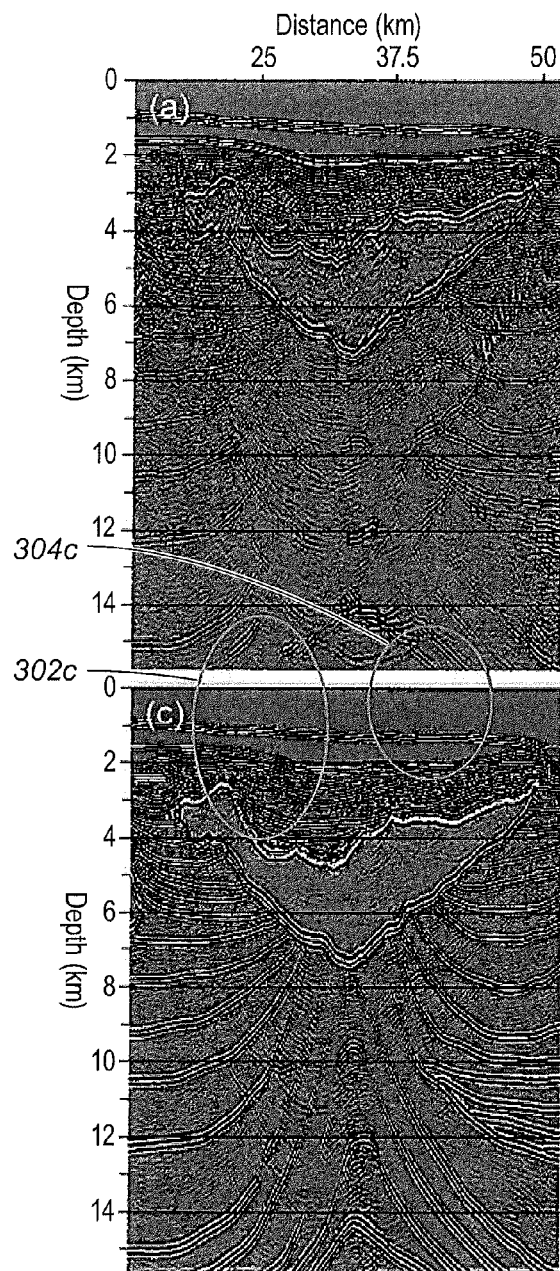
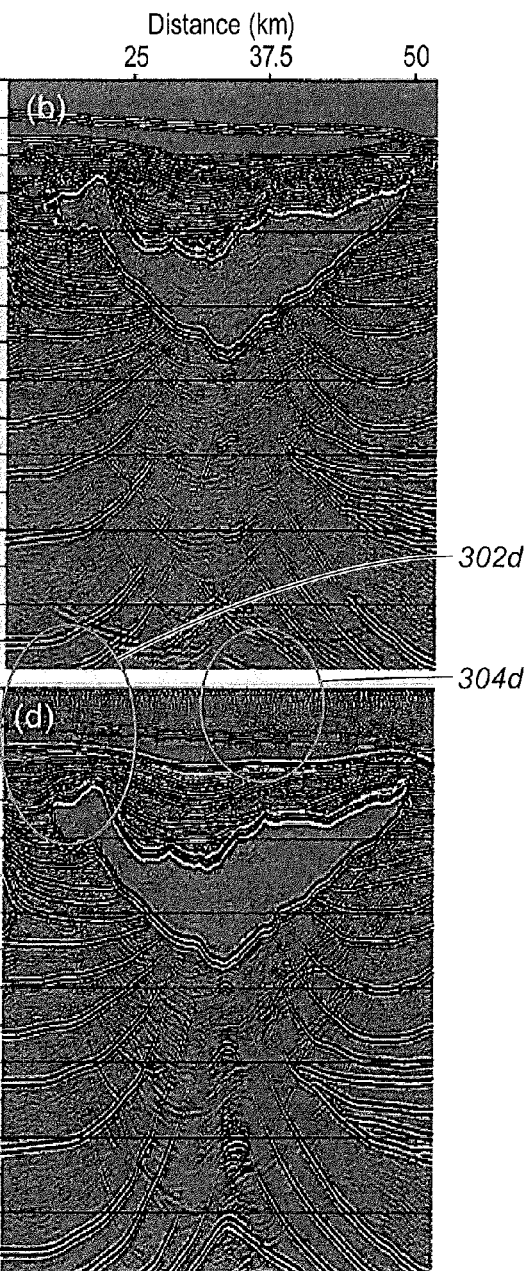
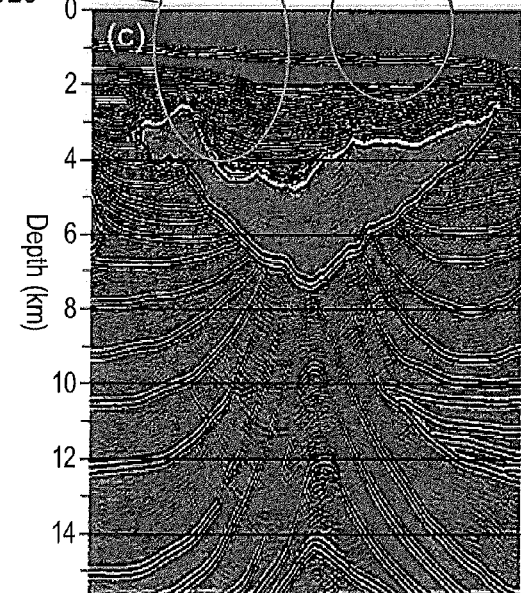
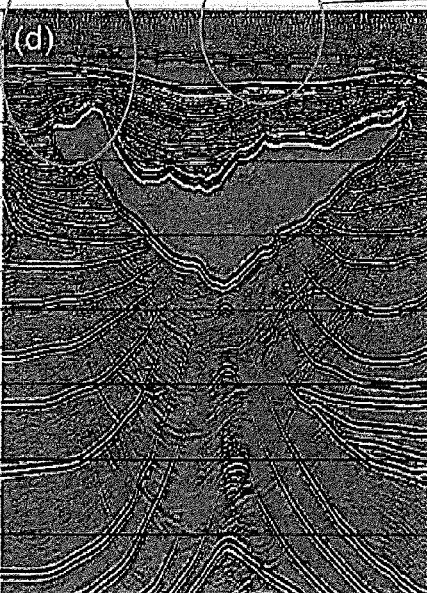
FIG. 3C
FIG. 3D

SYSTEMS AND METHODS FOR IMAGING SEISMIC DATA

CROSS-REFERENCE TO RELATED APPLICATIONS

The priority of PCT Patent Application No. PCT/US2012/051387, filed on Aug. 17, 2012, is hereby claimed, and the specification thereof is incorporated herein by reference.

STATEMENT REGARDING FEDERALLY SPONSORED RESEARCH

Not applicable.

FIELD OF THE INVENTION

The present invention generally relates to systems and methods for imaging seismic data. More particularly, the present invention relates to imaging seismic data using hybrid one-way wave equation migration in tilted transverse isotropic media ("hybrid TTI-WEM") and/or hybrid two-way reverse time migration in tilted transverse isotropic media ("hybrid TTI-RTM").

BACKGROUND OF THE INVENTION

As a commonly applied technique for imaging seismic data, conventional tilted transverse isotropic ("TTI") reverse time migration ("RTM") (collectively "TTI-RTM") propagates a source wave field forward in time and a receiver wave field backward in time to image the subsurface reflector by any well-known two-way wave equation such as the two-way wave equation described in the paper "*Reverse Time Migration: Geophysics*" by Baysal, et al. and in the paper "*Migration by Extrapolation of Time-Dependent Boundary Values: Geophysical Prospecting*" by G. A. McMechan. Although wave equation migration and/or reverse time migration are referred to herein as two-way, they may also be referred to as full-way. In the paper "*Acoustic Approximations for Processing in Transversely Isotropic Media*" by T. Aikhalifah, for example, conventional TTI-RTM is referenced to propose a pseudo-acoustic approximation in transversely isotropic media with a vertical axis ("VTI"). Based on the pseudo-acoustic approximation in VTI media, research such as, for example, that described in the papers "*An Anisotropic Acoustic Wave Equation for Modeling and Migration in 2D TTI Media*" by Zhou, et al. and "*Reverse Time Migration in Tilted Transversely Isotropic (TTI) Media*" by Fletcher, et al. extended this approximation from VTI to TTI media. These techniques enable structures with strong anisotropy to be imaged. Although conventional TTI-RTM has been applied widely, the computation cost and storage for wavefields are still disadvantages for current computer systems. In other words, the computation cost and memory requirement are still problems for large dataset migration, especially for three-dimensional ("3D") conventional TTI-RTM.

Instead of a two-way wave equation associated with conventional TTI-RTM, a one-way wave equation can provide faster processing and handle strong lateral velocity variation. One-way wave equations, such as a Finite Difference propagator, a Phase-Shift-Plus-Interpolation propagator, and/or a Generalized Screen propagator, demonstrate good accuracy in general. By extending the one-way isotropic wave equation migration ("WEM") to TTI-WEM as described in the papers "*3D Wavefield Extrapolation in Laterally Varying Tilted TI Media*" by San, et al., "*Implicit Wave Equation Migration in TTI Media Using High Order Operators*" by A. A. Valenciano, and "*3D TTI Implicit Finite Difference Migration With Nonlinear Optimized Four-Direction Splitting Expansion*" by Hua, et al., one-way WEM is able to produce an anisotropic image with high efficiency. Nevertheless, because the one-way WEM ignores up-going waves, one-way WEM fails to handle extremely complex structures, such as steeply dip events and over-turned reflectors.

To combine the advantages of one-way WEM and two-way WEM, a hybrid propagator for prestack migration in isotropic media was developed and is described in the paper "*Hybrid One-Way and Full-Way Wave Equation Propagator and Prestack Migration*" by Luo and Jin ("Luo and Jin") The hybrid propagator combines one-way and two-way WEM to extrapolate a wavefield progressively. In this manner, a one-way propagator may be applied to less complex media while the two-way propagator may be applied to extremely complicated media. Although the use of the Luo and Jin hybrid propagator in isotropic media generates comparable image results with two-way WEM for RTM with less noise and computational costs, it has not been applied to TTI media. Moreover, the Luo and Jin hybrid propagator does not contemplate the use of Pade approximation, which could provide maximum accuracy for wave propagation.

SUMMARY OF THE INVENTION

The present invention therefore, meets the above needs and overcomes one or more deficiencies in the prior art by providing systems and methods for imaging seismic data using hybrid TTI-WEM and/or hybrid TTI-RTM.

In one embodiment, the present invention includes a method for imaging seismic data, which comprises: i) approximating TTI coefficients using a Pade approximation and a dispersion relation equation; ii) applying hybrid TTI-WEM to a velocity model and anisotropic parameters for a pre-stack shot gather using the approximated TTI coefficients and a computer system to determine a source side wavefield propagation value and a receiver side wavefield propagation value in a frequency-space domain; iii) converting the source side wavefield propagation value and the receiver side wavefield propagation value from the frequency-space domain to a time-space domain; and iv) applying a zero-lag cross-correlation image condition equation to form a partial output image using the converted source side wavefield propagation value and the converted reservoir side wavefield propagation value.

In another embodiment, the present invention includes a non-transitory program carrier device tangibly carrying computer executable instructions for imaging seismic data, the instructions being executable to implement: i) approximating TTI coefficients using a Pade approximation and a dispersion relation equation; ii) applying hybrid TTI-WEM to a velocity model and anisotropic parameters for a pre-stack shot gather using the approximated TTI coefficients and a computer system to determine a source side wavefield propagation value and a receiver side wavefield propagation value in a frequency-space domain; iii) converting the source side wavefield propagation value and the receiver side wavefield propagation value from the frequency-space domain to a time-space domain; and iv) applying a zero-lag cross-correlation image condition equation to form a partial output image using the converted source side wavefield propagation value and the converted reservoir side wavefield propagation value.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which:

FIG. 2A is an image illustrating an exemplary velocity model.

FIG. 2B is an image illustrating an anisotropic parameter epsilon (ε) for the velocity model in FIG. 2A.

FIG. 2C is an image illustrating an anisotropic parameter delta (δ) for the velocity model in FIG. 2A.

FIG. 2D is an image illustrating an anisotropic parameter theta (θ) for the velocity model in FIG. 2A.

FIG. 3A is an image illustrating the results of conventional hybrid one-way WEM and conventional two-way RTM in isotropic media.

FIG. 3B is an image illustrating the results of conventional hybrid one-way WEM and conventional two-way RTM in VTI media.

FIG. 3C is an image illustrating the results of the method in FIG. 1.

FIG. 3D is an image illustrating the results of conventional two-way RTM in TTI media.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

The present invention significantly reduces the computational time associated with conventional two-way TTI-RTM by applying a hybrid TTI-WEM with an implicit finite difference algorithm and by applying a hybrid TTI-RTM with an explicit finite difference algorithm. The present invention also provides better image quality with less artifacts and can also handle geological topography naturally.

Method Description

Figure 1:
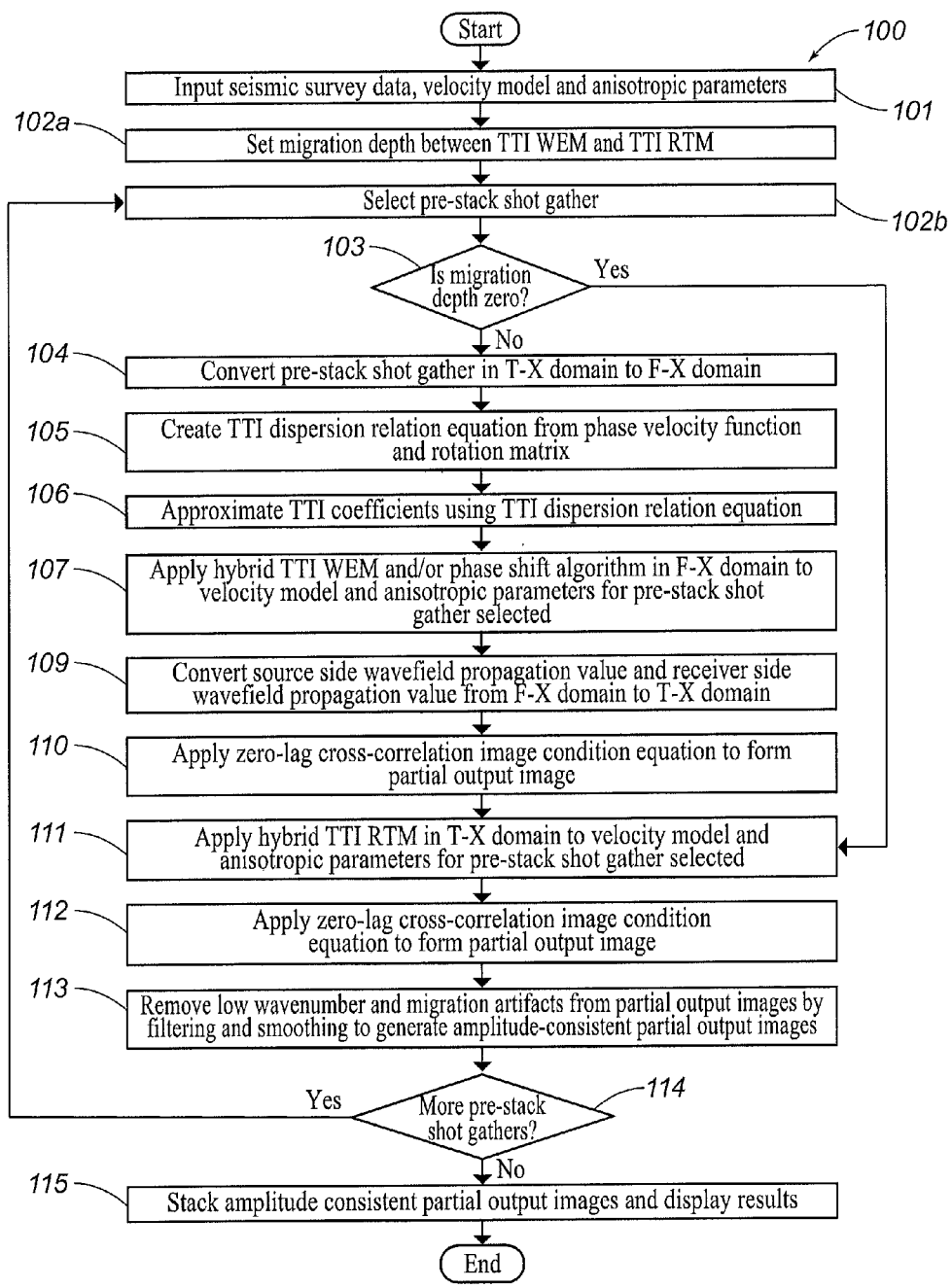
FIG. 1 is a flow diagram illustrating one embodiment of a method for implementing the present invention.

Referring now to FIG. 1, a flow diagram of one embodiment of a method 100 for implementing the present invention is illustrated.

Figure 6:
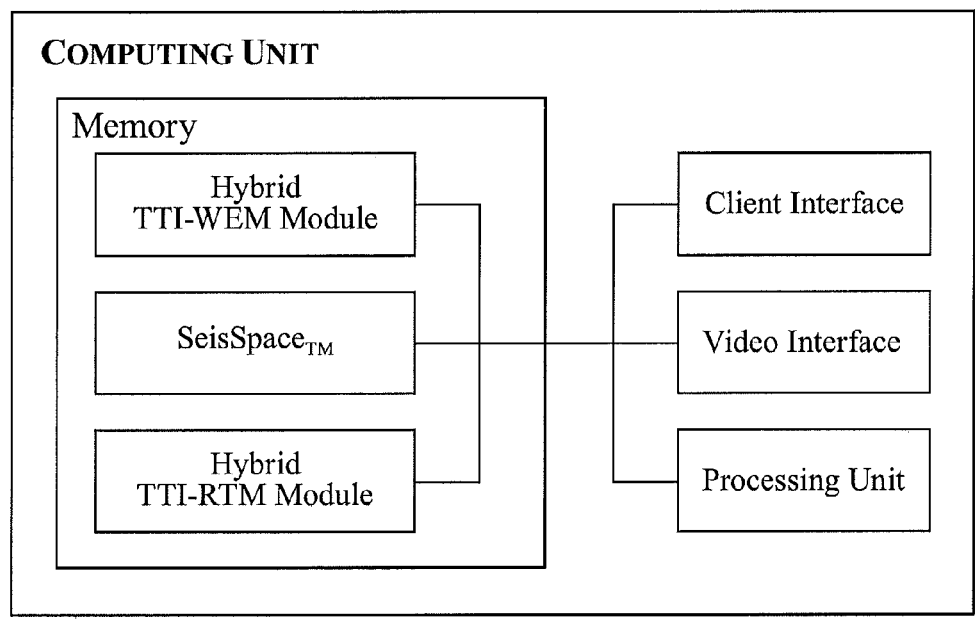
FIG. 6 is a block diagram illustrating one embodiment of a system for implementing the present invention.

In step 101, seismic survey data such as, for example, prestack shot gathers in time-space ("T-X") domain, a velocity model and anisotropic parameters such as, for example, epsilon (ε), delta (δ), tilted dip angle (θ) and azimuth angle (φ) are input using the client interface and/or the video interface described further in reference to FIG. 6.

In step 102a, a migration depth is set between the hybrid TTI-WEM and the hybrid TTI-RTM using the client interface and/or the video interface described further in reference to FIG. 6. The migration depth may be used to separate the velocity model and anisotropic parameters into an area where the hybrid TTI-WEM will be applied from a surface of the earth to the migration depth below the surface and an area where the hybrid TTI-RTM will be applied below the migration depth to an extent of the velocity model.

In step 102b, a prestack shot gather is selected from the prestack shot gathers in step 101 using the client interface and/or video interface described further in reference to FIG. 6. Alternatively, the prestack shot gather may be selected automatically. In either event, it may be selected at random or in any other predetermined manner.

In step 103, the method 100 determines if the migration depth is zero. If the migration depth is zero, then the method 100 proceeds to step 111 where only the hybrid TTI-RTM will be applied in the T-X domain to the prestack shot gather selected in step 102b using the velocity model and anisotropic parameters from a surface of the earth to the extent of the velocity model. If the migration depth is not zero; then the method 100 proceeds to step 104 where the hybrid TTI-WEM will be applied in the frequency-space ("F-X") domain to the prestack shot gather selected in step 102b using the velocity model and anisotropic parameters from a surface of the earth to the migration depth and the hybrid TTI-RTM will be applied in the T-X domain to the prestack shot gather selected in step 102b using the velocity model and anisotropic parameters from the migration depth to the extent of the velocity model.

In step 104, the prestack shot gather selected in step 102b is converted from its native T-X domain to the F-X domain using techniques well-known in the art such as, for example, a fast fourier transform ("FFT") algorithm.

In step 105, a TTI dispersion relation equation, which is also be referred to as a quartic equation, is created from the well-known phase velocity function and rotation matrix. By extending dispersion relation in laterally varying TTI media to 3D TTI media, including varying dip angle (θ) and azimuth angle (φ), and keeping the shear velocity non-zero to stabilize one-way wave extrapolation, the dispersion relation equation in 3D TTI media can be written as:

$$c_4 T_z^4 + c_3 T_z^3 + c_2 T_z^2 + c_1 T_z + c_0 = 0 \quad (1)$$

where:

$$c_4 = f - 1 + 2\varepsilon \sin^2\theta(f - 1) - \left(\frac{f}{2}(\varepsilon - \delta)\sin^2 2\theta\right)$$

$$c_3 = -((f-1)2\varepsilon\sin2\theta - f(\varepsilon-\delta)\sin4\theta)(T_x\cos\varphi - T_y\sin\varphi)$$

$$c_2 = (2(f-1)(1+\varepsilon) - f(\varepsilon-\delta)(2\cos^2 2a - \sin^2 2a))(T_x\cos\varphi - T_y\sin\varphi)^2 +$$
$$2((f-1)(1+\varepsilon) + (f-1)\varepsilon\sin^2\theta - f(\varepsilon-\delta)\cos^2\theta)(T_x\sin\varphi + T_y\cos\varphi)^2 +$$
$$(2\varepsilon\sin^2\theta + 2 - f)$$

$$c_1 = (2\varepsilon\sin2\theta(f-1) + f(\varepsilon-\delta)\sin4\theta)(T_x\cos\varphi - T_y\sin\varphi)^3 +$$
$$2\sin2\theta((f-1)\varepsilon + f(\varepsilon-\delta))(T_x\cos\varphi - T_y\sin\varphi)(T_x\sin\varphi + T_y\cos\varphi)^2 +$$
$$2\varepsilon\sin2\theta(T_x\cos\varphi - T_y\sin\varphi)$$

-continued $$c_0 = \left((f-1)(1+2\varepsilon\cos^2\theta) - \frac{f}{2}(\varepsilon-\delta)\sin^2 2\theta\right)(T_x\cos\varphi - T_y\sin\varphi)^4 +$$
$$(f-1)(1+2\varepsilon)(T_x\sin\varphi + T_y\cos\varphi)^4 +$$
$$2((f-1)(1+\varepsilon+\varepsilon\cos^2\theta) - f(\varepsilon-\delta)\sin^2\theta)(T_x\cos\varphi - T_y\sin\varphi)^2$$
$$(T_x\sin\varphi + T_y\cos\varphi)^2 + (2-f+2\varepsilon\cos^2\theta)(T_x\cos\varphi - T_y\sin\varphi)^2 +$$
$$((2+2\varepsilon-f)(T_x\sin\varphi + T_y\cos\varphi)^2 - 1)$$

There exists four solutions, two of them are related to up and down-going P-waves and the other two are related to up and down-going S-waves. The TTI dispersion relation equation (1) includes the anisotropic parameters from step 101 for the prestack shot gather selected in step 102(*b*).

In step 106, TTI coefficients are approximated using the TTI dispersion relation equation (1). One embodiment of a method 500 for approximating the TTI coefficients is described further in reference to FIG. 5.

In step 107, a hybrid TTI-WEM and/or a well-known phase shift algorithm are applied in the F-X domain to the velocity model and anisotropic parameters for the prestack shot gather selected in step 102*b*. If water is present in the velocity model and the migration depth is not below a subsurface where the water meets the earth, then only the phase shift algorithm is applied. If water is present in the velocity model and the migration depth is below a subsurface where the water meets the earth, then the hybrid TTI-WEM and the phase shift algorithm are applied. If water is not present in the velocity model, then only the hybrid TTI-WEM is applied. Because the velocity of water is a known constant, the anisotropic parameters are all zero when applying the phase shift algorithm. The hybrid TTI-WEM is applied from a surface of the earth or a subsurface where the water meets the earth to the migration depth. The phase shift algorithm is only applied from a water surface to a subsurface where the water meets the earth. In order to apply the hybrid TTI-WEM in the F-X domain, $T_x$, $T_y$ and $T_z$ from equation (8) are replaced by the partial differential operators $$i\frac{\partial P}{\partial x}\frac{V}{\omega}, i\frac{\partial P}{\partial y}\frac{V}{\omega} \text{ and } i\frac{\partial P}{\partial z}\frac{V}{\omega},$$

which produce the following equation:

$$\frac{\partial P}{\partial z} = i\frac{\omega}{V}\left(T_{z0} + \frac{a_1\left(\frac{V}{\omega}\frac{\partial P}{\partial x}\right)^2 + ic_1\frac{V}{\omega}\frac{\partial P}{\partial x}}{1+b_1\frac{V}{\omega}\frac{\partial P}{\partial x}} + \frac{a_2\left(\frac{V}{\omega}\frac{\partial P}{\partial y}\right)^2 + ic_2\frac{V}{\omega}\frac{\partial P}{\partial y}}{1+b_2\frac{V}{\omega}\frac{\partial P}{\partial y}}\right) \quad (2)$$

where P is the source side wavefield or the receiver side wavefield that must be propagated, V is velocity, $\omega$ is angular frequency, $T_{z0}$ is the solution for equation (1) when $T_x$ and $T_y$ are zero and $a_1$, $b_1$, $c_1$, $a_2$, $b_2$, $c_2$, are the values of the TTI coefficients from equation (8). Equation (2) can then be solved using a well-known implicit finite difference ("FD") algorithm and the following equations:

$$\frac{\partial P}{\partial z} = i\frac{\omega}{V}T_{z0} \quad (3.1)$$

$$\frac{\partial P}{\partial z} = i\frac{\omega}{V}\left(\frac{a_1\left(\frac{V}{\omega}\frac{\partial P}{\partial x}\right)^2 + ic_1\frac{V}{\omega}\frac{\partial P}{\partial x}}{1+b_1\frac{V}{\omega}\frac{\partial P}{\partial x}}\right) \quad (3.2)$$

$$\frac{\partial P}{\partial z} = i\frac{\omega}{V}\left(\frac{a_2\left(\frac{V}{\omega}\frac{\partial P}{\partial y}\right)^2 + ic_2\frac{V}{\omega}\frac{\partial P}{\partial y}}{1+b_2\frac{V}{\omega}\frac{\partial P}{\partial y}}\right) \quad (3.3)$$

Thus, the solution from equation (3.1), which is the value of P, is used as input to solve equation (3.2) and obtain the value of P, which is used as input to solve equation (3.3) and obtain the final value for P. In this manner, cascading is used with the implicit FD algorithm to obtain the final value of $P_1$ for source side wavefield propagation and the final value of $P_2$ for receiver side wavefield propagation. For source side wavefield propagation, the input is a Ricker wavelet (t). Assuming the source side wavefield is $P_1$ (iw, ix, iy, iz) and $P_1$=0, then $P_1$ (iw, ix, iy, =$P_1$ (iw, ix, iy, iz)+Ricker wavelet (iw), which is used to solve for $P_1$ in equation (3.1). For receiver side wavefield propagation, the input is gather (t, x, y), which is the prestack shot gather selected in step 102*b*. Assuming the receiver side wavefield is $P_2$ (iw, ix, iy, iz) and $P_2$=0, then $P_2$ (iw, ix, iy, iz)=$P_2$ (iw, ix, iy, iz)+gather (iw, ix, iy), which is used to solve for $P_2$ in equation (3.1). In order to apply the phase shift algorithm in the F-X domain when water is present in the velocity model, equation (3.1) is solved for $P_1$ and $P_2$. For source side wavefield propagation, the input is a Ricker wavelet (t). Assuming the source side wavefield is $P_1$ (iw, ix, iy, iz) and $P_1$=0, then $P_1$ (iw, ix, iy, iz)=$P_1$ (iw, ix, iy, iz)+Ricker wavelet (iw), which is used to solve for $P_1$ in equation (3.1). For receiver side wavefield propagation, the input is gather (t, x, y), which is the prestack shot gather selected in step 102*b*. Assuming the receiver side wavefield is $P_2$ (iw, ix, iy, iz) and $P_2$=0, then $P_2$ (iw, ix, iy, iz)=$P_2$ (iw, ix, iy, iz)+gather (iw, ix, iy), which is used to solve for $P_2$ in equation (3.1). In this manner, $P_1$ and $P_2$ may be used as the input in equation (3.1) to solve for $P_1$ and $P_2$ when applying TTI-WEM in the FX-domain instead of using the assumed $P_1$ and $P_2$ described hereinabove when only hybrid TTI-WEM is applied.

In step 109, the source side wavefield propagation value ($P_1$) and the receiver side wavefield propagation value ($P_2$) from the hybrid TTI-WEM and/or the phase shift algorithm in step 107 are converted from the F-X domain to the T-X domain using techniques well-known in the art such as, for example, an inverse fast fourier transform ("IFFT") algorithm.

In step 110, the following zero-lag cross-correlation image condition equation is applied to form a partial output image ($I_{time}$ (x, y, z)) using $P_1$ and $P_2$ from the hybrid TTI-WEM and/or the phase shift algorithm in step 107:

$$I_{time}(x, y, z) = \sum_{it=1}^{m} P_1(x, y, z, it) * P_2(x, y, z, it) \quad (4)$$

In step 111, a hybrid TTI-RTM is applied in the T-X domain to the velocity model and anisotropic parameters for the prestack shot gather selected in step 102*b*. The hybrid TTI-RTM is applied from the migration depth, which may be a surface of the earth if it is zero, to the extent of the velocity model. P1 and P2 from the hybrid TTI-WEM and/or the phase shift algorithm in step 107 are used as input to solve equation (5):

$$\frac{\partial^2 \sigma_H}{\partial t^2} = V_p^2(1+2\varepsilon)M'\sigma_H + (V_p^2 - V_{sv}^2)\sqrt{1+2\delta}\, N'\sigma_V + V_{sv}^2 N'\sigma_H \quad (5)$$

$$\frac{\partial^2 \sigma_V}{\partial t^2} = \left(V_p^2\sqrt{1+2\delta} - \frac{V_{sv}^2}{\sqrt{1+2\delta}}\right)M'\sigma_H + V_p^2 N'\sigma_V + V_{sv}^2 M'\sigma_V$$

where:

$$M' = \left\{ \begin{array}{l} (1-\sin^2\theta\cos^2\varphi)\frac{\partial^2}{\partial x^2} + (1-\sin^2\theta\sin^2\varphi)\frac{\partial^2}{\partial y^2} + \sin^2\theta\frac{\partial^2}{\partial z^2} \\ -\sin 2\theta\sin\varphi\frac{\partial^2}{\partial y \partial z} - \sin 2\theta\cos\varphi\frac{\partial^2}{\partial x \partial z} - \sin^2\theta\sin 2\varphi\frac{\partial^2}{\partial x \partial y} \end{array} \right\}$$

$$N' = \left\{ \begin{array}{l} \sin^2\theta\cos^2\varphi\frac{\partial^2}{\partial x^2} + \sin^2\theta\sin^2\varphi\frac{\partial^2}{\partial y^2} + \cos^2\theta\frac{\partial^2}{\partial z^2} \\ +\sin 2\theta\sin\varphi\frac{\partial^2}{\partial y \partial z} + \sin 2\theta\cos\varphi\frac{\partial^2}{\partial x \partial z} + \sin^2\theta\sin 2\varphi\frac{\partial^2}{\partial x \partial y} \end{array} \right\}$$

and where $\sigma_H$, $\sigma_V$ are horizontal and vertical stress components, respectively, and $\theta$ and $\phi$ are dip and azimuth angle, respectively. Equation (5) thus, may be solved using a well-known explicit FD algorithm in the manner described in International Patent Application Publication No. WO/2011/053327, which is incorporated herein by reference. When $\theta$ and $\phi$ are set to zero with $\varepsilon$ and $\delta$, equations (1) and (8) become hybrid VTI-RTM schemes, when $\theta$, $\phi$, $\varepsilon$, and $\delta$ are all set to zero, they will become traditional hybrid isotropic RTM schemes.

In step 112, the zero-lag cross-correlation image condition equation (4) is applied to form a partial output image ($I_{time}$ (x, y, z)) using $P_1$ and $P_2$ from the hybrid TTI-RTM in step 111.

In step 113, low wave number and migration artifacts are removed from the partial output images in steps 110 and 112 by filtering and smoothing to generate amplitude consistent partial output images. A well-known low-wave number filter is applied to the partial output images from steps 110 and 112, then each filtered partial output image is divided by the source-side wavefield propagation value $P_1$ from step 111 to generate the amplitude consistent partial output images.

In step 114, the method 100 determines if there are more prestack shot gathers from the seismic survey data in step 101. If there are more prestack shot gathers, then the method 100 returns to step 102b to select another prestack shot gather. If there are no more prestack shot gathers, then the method 100 proceeds to step 115.

In step 115, the amplitude consistent partial output images from each iteration of step 113 are stacked and displayed using techniques well-known in the art. As a result, noise will be significantly cancelled and the final image will be enhanced.

Figure 5:
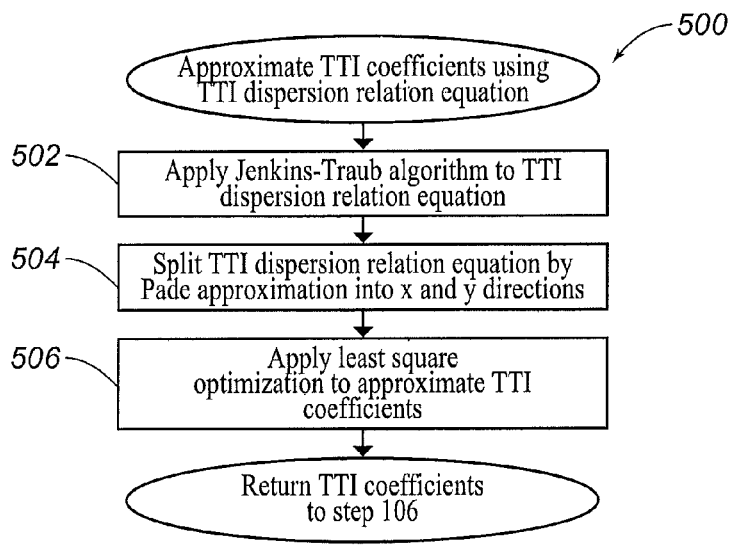
FIG. 5 is a flow diagram illustrating one embodiment of a method for implementing step 106 in FIG. 1.

Referring now to FIG. 5, one embodiment of a method 500 is illustrated for performing step 106 in FIG. 1.

In step 502, a Jenkins-Traub algorithm is applied to equation (1) to solve for $T_z$ which represents polynomial zeros that relate to a down-going P-wave.

In step 504, the TTI dispersion relation equation (1) is split by Pade approximation into x and y directions. Equation (1) then becomes:

$$T_z \approx T_{z0} - \frac{\sum_{j=1}^{2n} \alpha_j T_x^j}{1 - \sum_{i=1}^{n} \beta_i (T_x^2)^i} - \frac{\sum_{j=1}^{2n} \alpha_j T_y^j}{1 - \sum_{i=1}^{n} \beta_i (T_y^2)^i} \quad (6)$$

In step 506, a least square optimization method is applied to equation (6), which forms equation (7) and is solved for $\alpha_j$ and $\beta_i$ to ultimately approximate the TTI coefficients.

$$\min \int_{Y_{ymin}}^{T_{ymax}} \int_{T_{xmin}}^{T_{xmax}} T_z - \quad (7)$$

$$\left( T_{z0} - \frac{\sum_{j=1}^{2n} \alpha_j T_x^j}{1 - \sum_{i=1}^{n} \beta_i (T_x^2)^i} - \frac{\sum_{j=1}^{2n} \alpha_j T_y^j}{1 - \sum_{i=1}^{n} \beta_i (T_y^2)^i} \right) dT_x dT_y$$

A least square optimization method such as, for example, the well-known Bonded Variable Least Square optimization method may be used. Once $\alpha_j$ and $\beta_i$ are known, a second order Pade approximation may be used to approximate the TTI coefficients. For second order approximation, the maximum propagation angle is up to 50°. Thus, the upper limit of $T_x$ and $T_y$ for least square optimization is less than +0.85 and the lower limit of $T_x$ and $T_y$ is greater than −0.85. For fourth order approximation, the maximum propagation angle is up to 70°. Thus, the upper limit of $T_x$ and $T_y$ for least square optimization is less than +0.90 and the lower limit of $T_x$ and $T_y$ is greater than −0.90. Because the hybrid TTI-WEM may be applied in shallow places, second order approximation is satisfactory for good image quality, however, any order for approximation could be used. In this manner, a large propagation angle is obtainable over other well-known methods that produces better image quality. By second order Pade approximation, $\alpha_j$ and $\beta_i$ are transferred to approximate the TTI coefficients ($a_i$, $b_i$, $c_i$) in the following equation:

$$T_z = T_{z0} - \frac{a_1 T_x^2 + c_1 T_x}{1 - b_1 T_x^2} - \frac{a_2 T_y^2 + c_2 T_y}{1 - b_2 T_y^2} \quad (8)$$

The TTI coefficients ($a_i$, $b_i$, $c_i$) from equation (8) may be saved in respective tables before applying the hybrid TTI-WEM.

EXAMPLES

In this example, hybrid TTI-RTM and conventional two-way TTI-RTM are applied to offshore data for a comparison of their resulting images. A phase shift algorithm was applied according to step 107 in FIG. 1 from a water surface to a subsurface where the water meets the earth. The hybrid TTI-WEM was applied according to step 107 in FIG. 1 from the subsurface to a migration depth of 2 km. The hybrid TTI-WEM was applied from 2 km to the extent of the velocity model at 16 km according to step 111 in FIG. 1. An image of the velocity model is illustrated in FIG. 2A. The anisotropic parameters for the velocity model in FIG. 2A are illustrated in FIGS. 2B($\varepsilon$), 2C($\delta$) and 2D($\theta$).

As illustrated by a comparison of FIGS. 3A and 3B with FIG. 3C, the application of the hybrid TTI-RTM as a result of the method 100 in FIG. 1 produces a much cleaner and clearer image (FIG. 3C) than the images produced by conventional techniques in isotropic media (FIG. 3A) and conventional techniques in VTI media (FIG. 3B). Moreover, the image in FIG. 3C is much cleaner and clearer than the image in FIG. 3D at the water layer, which was produced by a conventional two-way RTM in TTI media. For example, the image ghost within circle 302d and circle 304d in FIG. 3D is not as evident within circle 302c and circle 304c in FIG. 3C. In the example illustrated by FIG. 3C, hybrid TTI-RTM saves 20% computational time than conventional two-way TTI-RTM when the migration depth is set at 2 km out of a total 16 km. If the migration depth is set deeper, more computational time may be saved. In table 2 below, the relative computation time for hybrid TTI-RTM and two-way conventional TTI-RTM in isotropic, VTI and TTI media is illustrated for this example.

TABLE 2

|  | Two-Way TTI-RTM (s) | Hybrid TTI-RTM (s) |
| --- | --- | --- |
| Isotropic | 1.0 | 0.75 |
| VTI | 2.0 | 1.63 |
| TTI | 4.0 | 2.75 |

Figures 4A, 4B:
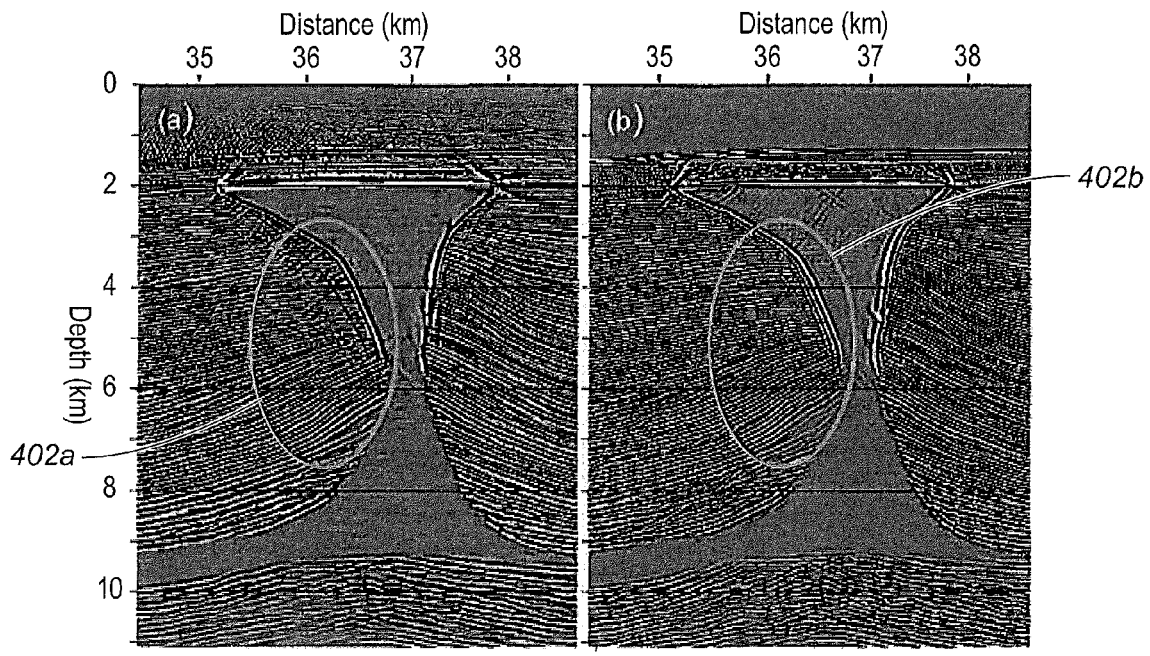
FIG. 4A is an image illustrating the results of conventional two-way TTI-RTM.
FIG. 4B is an image illustrating the results of the method in FIG. 1.

In another example, the application of the hybrid TTI-RTM is tested on 2007 TTI data from BP. The image in FIG. 4A illustrates the results of conventional two-way TTI-RTM. The image in FIG. 4B illustrates the hybrid TTI-RTM as a result of the method 100 in FIG. 1. Although the conventional two-way TTI-RTM image in FIG. 4A accurately illustrates a salt boundary, noise appears on the top of the image and an image ghost appears within the circle 402a. By applying hybrid TTI-RTM, the noise at the top of the image in FIG. 4B weakens and the image ghost within the circle 402b beside a salt boundary is significantly reduced.

Hybrid TTI-RTM thus, will handle rugged topography and complex near surface layers by wave equation datuming. Conventional two-way TTI-RTM, however, cannot handle topography or must apply vertical static shift to the pre-stack shot gather. Wave equation datuming is therefore, more accurate than applying a vertical static shift, especially for areas where the velocity contrast between the near surface and the substratum is not large. Hybrid TTI-WEM will also generate better results than applying a vertical static shift.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. SeisSpace™, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 6, a block diagram of a system for implementing the present invention on a computer is illustrated. The system includes a computing unit, sometimes referred to as a computing system, which contains memory, application programs, a client interface, a video interface and a processing unit that includes a graphics processor or graphics card. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-5. The memory therefore, includes a hybrid TTI-WEM module and a hybrid TTI-RTM module, which enable the method illustrated and described in reference to FIG. 1. and integrates functionality from the remaining application programs illustrated in FIG. 6. The hybrid TTI-WTM module therefore, may be used to implement steps 104-110 in FIG. 1 and the hybrid TTI-RTM module may be used to implement steps 111-113 in FIG. 1. Alternatively, the TTI-WEM module and the TTI-RTM module may be combined into a single module to implement steps 104-113 in FIG. 1. The memory also includes SeisSpace,™ which may be used as an interface application to supply input data to the hybrid TTI-WEM module and the hybrid TTI-RTM module and/or display the data results from the hybrid TTI-WEM module and the hybrid TTI-RTM module. SeisSpace™, therefore, may be used to implement steps 101-102b and 114-115 in FIG. 1. Although SeisSpace™ may be used as an interface application, other interface applications may be used, instead, or each hybrid TTI-WEM module and hybrid TTI-RTM module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for imaging seismic data, which comprises:
   approximating TTI coefficients using a Pade approximation and a dispersion relation equation;
   applying hybrid TTI-WEM to a velocity model and anisotropic parameters for a pre-stack shot gather using the approximated TTI coefficients and a computer system to determine a source side wavefield propagation value and a receiver side wavefield propagation value in a frequency-space domain;
   converting the source side wavefield propagation value and the receiver side wavefield propagation value from the frequency-space domain to a time-space domain; and
   applying a zero-lag cross-correlation image condition equation to form a partial output image using the converted source side wavefield propagation value and the converted reservoir side wavefield propagation value.

2. The method of claim 1, further comprising:
   applying hybrid TTI-RTM to the velocity model and the anisotropic parameters for the pre-stack shot gather using the converted source side wavefield propagation value and the converted receiver side wavefield propagation value to determine another source side wavefield propagation value and another receiver side wavefield propagation value in the time-space domain; and
   applying the zero-lag cross-correlation image condition equation to form another partial output image using the another source side wavefield propagation value and the another receiver side wavefield propagation value.

3. The method of claim 2, further comprising:
   stacking each partial output image; and
   displaying the stacked partial output images.

4. The method of claim 1, wherein the dispersion relation equation is created from a phase velocity function and a rotation matrix.

5. The method of claim 2, further comprising applying a phase shift algorithm to the velocity model and the anisotropic parameters for the pre-stack shot gather before applying the hybrid TTI-WEM to determine the source side wavefield propagation value and the receiver side wavefield propagation value.

6. The method of claim 5, further comprising setting a migration depth between the hybrid TTI-WEM and the hybrid TTI-RTM.

7. The method of claim 6, wherein the phase shift algorithm is applied to the velocity model and the anisotropic parameters from a water surface to a subsurface where the water meets earth.

8. The method of claim 6, wherein the hybrid TTI-WEM is applied to the velocity model and the anisotropic parameters from an earth surface or a subsurface where water meets the earth to the migration depth.

9. The method of claim 6, wherein the hybrid TTI-RTM is applied to the velocity model and the anisotropic parameters from the migration depth to an extent of the velocity model.

10. The method of claim 2, further comprising:
    filtering and smoothing each partial output image to generate a respective amplitude-consistent partial output image;
    stacking each amplitude-consistent partial output image; and
    displaying the stacked amplitude-consistent partial output images.

11. A non-transitory program carrier device tangibly carrying computer executable instructions for imaging seismic data, the instructions being executable to implement:
    approximating TTI coefficients using a Pade approximation and a dispersion relation equation;
    applying hybrid TTI-WEM to a velocity model and anisotropic parameters for a pre-stack shot gather using the approximated TTI coefficients and a computer system to determine a source side wavefield propagation value and a receiver side wavefield propagation value in a frequency-space domain;

converting the source side wavefield propagation value and the receiver side wavefield propagation value from the frequency-space domain to a time-space domain; and applying a zero-lag cross-correlation image condition equation to form a partial output image using the converted source side wavefield propagation value and the converted reservoir side wavefield propagation value.

12. The program carrier device of claim 11, further comprising:

applying hybrid TTI-RTM to the velocity model and the anisotropic parameters for the pre-stack shot gather using the converted source side wavefield propagation value and the converted receiver side wavefield propagation value to determine another source side wavefield propagation value and another receiver side wavefield propagation value in the time-space domain; and applying the zero-lag cross-correlation image condition equation to form another partial output image using the another source side wavefield propagation value and the another receiver side wavefield propagation value.

13. The program carrier device of claim 12, further comprising:

stacking each partial output image; and displaying the stacked partial output images.

14. The program carrier device of claim 11, wherein the dispersion relation equation is created from a phase velocity function and a rotation matrix.

15. The program carrier device of claim 12, further comprising applying a phase shift algorithm to the velocity model and the anisotropic parameters for the pre-stack shot gather before applying the hybrid TTI-WEM to determine the source side wavefield propagation value and the receiver side wavefield propagation value.

16. The program carrier device of claim 15, further comprising setting a migration depth between the hybrid TTI-WEM and the hybrid TTI-RTM.

17. The program carrier device of claim 16, wherein the phase shift algorithm is applied to the velocity model and the anisotropic parameters from a water surface to a subsurface where the water meets earth.

18. The program carrier device of claim 16, wherein the hybrid TTI-WEM is applied to the velocity model and the anisotropic parameters, from an earth surface or a subsurface where water meets the earth to the migration depth.

19. The program carrier device of claim 16, wherein the hybrid TTI-RTM is applied to the velocity model and the anisotropic parameters from the migration depth to an extent of the velocity model.

20. The program carrier device of claim 12, further comprising:

filtering and smoothing each partial output image to generate a respective amplitude-consistent partial output image;

stacking each amplitude-consistent partial output image; and displaying the stacked amplitude-consistent partial output images.

* * * * *